(12) United States Patent
Lanni

(10) Patent No.: US 7,365,524 B2
(45) Date of Patent: *Apr. 29, 2008

(54) TIP HAVING ACTIVE CIRCUITRY

(75) Inventor: Thomas W. Lanni, Laguna Niguel, CA (US)

(73) Assignee: Comarco Wireless Technologies, Inc., Lake Forest, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/725,612

(22) Filed: Mar. 20, 2007

(65) Prior Publication Data

US 2007/0182388 A1    Aug. 9, 2007

Related U.S. Application Data

(63) Continuation of application No. 10/927,619, filed on Aug. 26, 2004, now Pat. No. 7,193,398, which is a continuation of application No. 10/313,662, filed on Dec. 5, 2002, now Pat. No. 6,836,101.

(51) Int. Cl.
  *G04F 1/40* (2006.01)
  *G04F 1/618* (2006.01)
(52) U.S. Cl. ............... 323/274; 323/284; 323/221
(58) Field of Classification Search ........... 323/273, 323/274, 283, 284, 221, 282
See application file for complete search history.

(56) References Cited

U.S. PATENT DOCUMENTS

| | | | |
|---|---|---|---|
| 2,914,704 A | 11/1959 | Nesler et al. |
| 3,048,805 A | 8/1962 | Bemi |
| 3,049,687 A | 8/1962 | Bemi |
| 3,111,641 A | 11/1963 | Wilentchik |
| 3,978,465 A | 8/1976 | Goode |
| 4,257,089 A | 3/1981 | Ravis |
| 4,307,441 A | 12/1981 | Bello |
| 4,442,382 A | 4/1984 | Fleck |
| 4,622,627 A | 11/1986 | Rodriguez et al. |
| 4,734,839 A | 3/1988 | Barthold |
| 4,747,034 A | 5/1988 | Dickey |
| 4,885,674 A | 12/1989 | Varga et al. |
| 4,890,214 A | 12/1989 | Yamamoto |
| 4,912,392 A | 3/1990 | Faulkner |
| 5,019,954 A | 5/1991 | Bourgeault et al. |
| 5,146,394 A | 9/1992 | Ishii et al. |
| 5,177,431 A | 1/1993 | Smith et al. |
| 5,177,675 A | 1/1993 | Archer |
| 5,184,291 A | 2/1993 | Crowe et al. |
| D339,103 S | 9/1993 | Dickey |
| 5,295,058 A | 3/1994 | McGreevy |
| 5,309,348 A | 5/1994 | Leu |

(Continued)

FOREIGN PATENT DOCUMENTS

DE    2013817 U1    11/2001

OTHER PUBLICATIONS

Press Release of Empire Engineering, Electronic Design and Management, Jul. 5, 1995—San Luis Obispo, CA USA, pp. 1-2.

(Continued)

*Primary Examiner*—Bao Vu
(74) *Attorney, Agent, or Firm*—Pillsbury Winthrop Shaw Pittman LLP

(57) ABSTRACT

A power supply system includes an adapter to receive power from a power source, and output a regulated output voltage ($V_{out}$). A tip receives $V_{out}$ from the adapter, and output $V_{out}$ to an electronic device. The tip includes active circuitry to adjust a programming voltage ($V_{prog}$). $V_{prog}$ is fed back to the adapter to control a magnitude of $V_{out}$.

15 Claims, 7 Drawing Sheets

U.S. PATENT DOCUMENTS

| | | | |
|---|---|---|---|
| 5,345,592 | A | 9/1994 | Woodmas |
| 5,347,211 | A | 9/1994 | Jakubowski |
| D359,474 | S | 6/1995 | Palatov |
| 5,479,331 | A | 12/1995 | Lenni |
| 5,510,691 | A | 4/1996 | Palatov |
| 5,559,422 | A | 9/1996 | Fahrenkrug et al. |
| D375,936 | S | 11/1996 | Palatov |
| 5,589,762 | A | 12/1996 | Iannuzo |
| 5,636,110 | A | 6/1997 | Lanni |
| 5,672,951 | A | 9/1997 | Shiota |
| D391,227 | S | 2/1998 | Dickey |
| 5,717,318 | A | 2/1998 | Matsuda et al. |
| 5,739,672 | A | 4/1998 | Lane |
| 5,739,673 | A | 4/1998 | Le Van Suu |
| 5,770,895 | A | 6/1998 | Kumasaka |
| 5,773,961 | A | 6/1998 | Cameron et al. |
| 5,838,554 | A | 11/1998 | Lanni |
| 5,861,732 | A | 1/1999 | Takimoto et al. |
| 5,886,422 | A | 3/1999 | Mills |
| 5,949,213 | A | 9/1999 | Lanni |
| 6,064,177 | A | 5/2000 | Dixon |
| 6,091,611 | A | 7/2000 | Lanni |
| 6,172,884 | B1 | 1/2001 | Lanni |
| 6,194,875 | B1 | 2/2001 | Takimoto et al. |
| 6,201,376 | B1 | 3/2001 | Mweene et al. |
| 6,670,797 | B2 | 12/2003 | Johanning |
| 6,678,178 | B2 | 1/2004 | Lipcsei |
| 6,703,815 | B2 | 3/2004 | Biagi |
| 6,836,101 | B2 | 12/2004 | Lanni |

OTHER PUBLICATIONS

Description of the "Smart Adapter System", Nesco Battery Systems, pp. 1-2.

MacWorld "On the Road", vol. 12, No. 7, Jul. 1995, pp. 141-142, 5/9/1 (Item 1 from file: 15) DIALOG(r) File 15:ABI/INFORM(r).

Data Sheet for Benchmarq Model BQ2002C, Fast-Charge IC, Sep. 1997, 8 pages.

Data Sheet for Benchmarq Model BQ2954, Lithium Ion Fast-Charge IC, Nov. 1997, 14 pages.

"Portable Computers Fly High in the Sky with Airline Seat Power," [on-line], Nov. 18, 1996 [retrieved Feb. 13, 2001], pp. 1-2, retrieved from Internet: http://www.roadwarrior.com/xtend/news/pressreleases/pr-961118.html.

"New PowerXtenders Adapter Lets Portable Comuter Users Plug Into Computer Power on Airplanes and Cars," [on-line], Apr. 30, 1997, [retrieved Feb. 13, 2001], pp. 1-3, retrieved from Internet: http://www.roadwarrior.com/xtend/news/pressreleases/pr-970420.html.

Declaration of Ejaz Afzal in Opposition to Comarco's Motion for Preliminary Injunction, dated Apr. 30, 2003, 9-pgs w/Exhibits 1-2 attached.

Declaration of Ejaz Afzal in Support of Mobility Electronics, Inc.'s Motion for Summary Judgment, dated May 6, 2003, 10-pgs w/Exhibits 1-2 attached.

Declaration of David Dickey in Support of Mobility Electronics, Inc.'s Motion for Summary Judgment, dated Jun. 2, 2003, 8-pgs w/Exhibits 1-13 attached.

Declaration of David Dickey in Opposition to Comarco's Motion for Summary Judgment, dated Jun. 2, 2003, 8-pgs w/Exhibits 1-13 attached.

European Search Report from European Patent Office, Jun. 21, 2005, EP Application No. EP 03 25 7679.

Motorola: Analog 1C Device Data, DC-to-DC Converter Circuits—vol. 1, DL 128/D—Revision 6, 1996, XP002330527.

TIP HAVING ACTIVE CIRCUITRY

RELATED APPLICATIONS

This application is a continuation application of application Ser. No. 10/927,619, filed Aug. 26, 2004, now U.S. Pat. No. 7,139,398, which is a continuation application of application Ser. No. 10/313,662, filed Dec. 5, 2002, now U.S. Pat. No. 6,836,101, entitled "Tip Having Active Circuitry."

BACKGROUND OF THE INVENTION

1. Technical Field

This invention relates to power adapters, and more specifically, to a system, method, and apparatus housed within a power adapter tip to control a supply voltage for use by an electronic device coupled to the tip.

2. Description of the Related Arts

There are power systems in the art which provide an interface between a power adapter and an electronic device to regulate the amount of power supplied to the electronic device. Such power systems include the power adapter, a cable coupled to the power adapter, the electronic device, and a "tip" to interface between the cable and the electronic device. The cable or tip can include resistors which passively control the amount of voltage output by the power adapter.

There is a power system which has a power adapter which utilizes the following signals: (a) a programming voltage ($V_{prog}$), (b) ground (GND), and (c) an output voltage ($V_{out}$) to supply to the electronic device. $V_{out}$ is produced by the power adapter and can be controlled by coupling a resistor of a set value between $V_{prog}$ and GND. The $V_{out}$ produced depends upon the resistor value. Accordingly, the resistor is used to "passively program" $V_{out}$.

Such a power system produces at the output of the power adapter the $V_{out}$ determined by the resistor value. $V_{out}$ from the power adapter is applied to a first end of a cable, the second end of which is coupled to the electronic device. The cable as an internal resistance. As a result of this internal resistance, there is a voltage drop across the cable. For example, if 1 Amp of current is supplied by the power adapter, and the cable has an internal resistance of 0.5 Ohms, there will be a 0.5 Volt voltage drop across the cable. Therefore, if the resistor sets $V_{out}$ supplied by the power adapter at 12 volts, only 11.5 volts will actually be available to the electronic device. Alternatively, if 0.5 Amps of current is supplied, then the voltage drop would be 0.25 Volts ((0.5 Amp)×(0.5 Ohms)). The internal resistance of cables may be dependent upon the materials from which the cable is formed, the length of the cable, etc. Accordingly, even if $V_{out}$ of the power adapter is passively programmed to be 12 Volts, for example, current systems do not ensure that 12 Volts are actually supplied to the electronic device, due to the internal resistance of the cable.

Also, systems which passively program the voltage are slow to compensate for fluctuations in the output voltage amount. For example, if the electronic device being powered is a DVD player, when the motor starts spinning, the DVD player will draw more current than had been drawn before its motor started spinning. Accordingly, the load will substantially increase, resulting in a lower $V_{out}$, which must then be corrected. Typically, the power adapter is a regulated power supply which includes a feedback path from its output to control the regulation. Thus, the power adapter will compensate for the decrease in $V_{out}$ by supplying more current, thereby raising $V_{out}$ (at the output of the power adapter) to the correct voltage level. The power adapter itself detects the change in the load and compensates for the increased load. Since the power adapter detects the load change at its output, rather than at the input to the electronic device (the cable being therebetween), there is a lag time between when the load changes and when the $V_{out}$ is changed.

Current systems also do not protect the electronic device if the adapter operates improperly and supplies too much power to the electronic device. This excess power can result in damage to the electronic device. Moreover, a user has no way to quickly determine whether the adapter is malfunctioning.

Accordingly, prior systems would be improved if the actual amount of voltage supplied to the electronic device would be regulated at the input to the electronic device rather than at the output of the power adapter, eliminating the effect of the voltage drop across the cable. It is also desirable to decrease the response time (i.e., increase the loop gain) between when the load of the electronic device changes and when $V_{out}$ is compensated to the correct level, as compared to current systems. It is further desirable to interrupt the supply of power to the electronic device if a malfunction of the system is detected and to provide the user with an indication of such malfunction.

DETAILED DESCRIPTION

An embodiment of the present invention is directed to a power supply system to power an electronic device. The power supply system may include a power adapter to provide an output voltage ($V_{out}$) to the electronic device. The power adapter may also provide a ground reference voltage (GND) and receive (a) a voltage programming voltage ($V_{prog}$), and (b) a current programming voltage ($V_{Iprog}$). A cable may be used to couple the power adapter to an active tip which contains circuitry to control $V_{out}$. The active tip is coupled to the electronic device. The active tip may have an outlet jack having a physical size dependent upon the electronic device being powered. For example, a laptop computer may receive a tip jack having a different size than a tip jack which can be coupled to a personal digital assistant (PDA). Also, the active tip may include active programming circuitry to regulate the $V_{out}$ supplied to the electronic device. Since the programming circuitry is active and in the active tip, the $V_{out}$ supplied to the electronic device may be precisely controlled, and the effect of a voltage drop across the cable is effectively eliminated. Also, because the active circuitry is contained within the tip, $V_{out}$ may more quickly compensate when the effective load of the electronic device changes (i.e., the power supply system may have a greater "system loop gain"). Moreover, the active tip may include circuitry to detect an error in the amount of power supplied by the adapter, and prevent power from reaching the electronic device. The active tip may further include circuitry to indicate to a user whether the adapter is functioning properly or improperly.

Figure 1A:
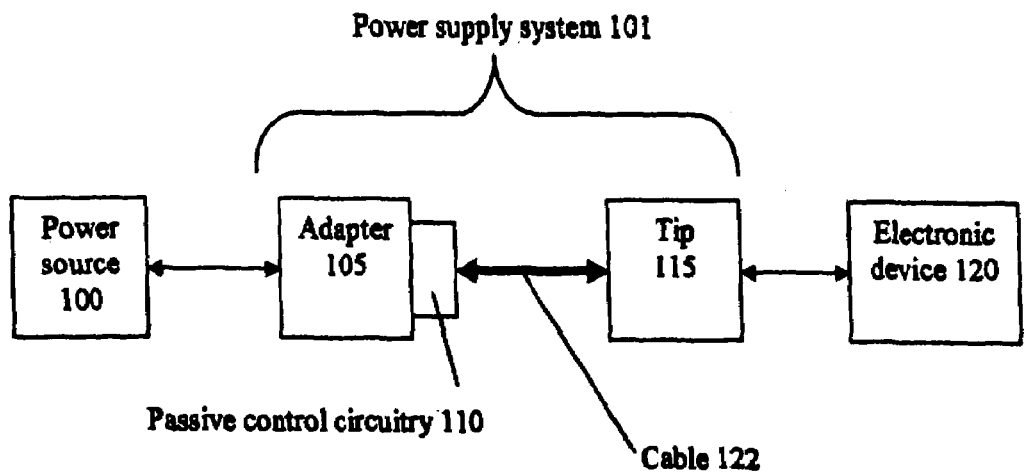
FIG. 1A illustrates a power supply system according to the prior art.

FIG. 1A illustrates a power supply system 101 according to the prior art. As illustrated, a power source 100 is coupled to an adapter 105. The adapter 105 can be used to provide a regulated DC voltage. The adapter 105 can coupled to a cable 122, and the cable 122 can be coupled to a tip 110. The tip 110 can be utilized to provide the regulated DC voltage to an electronic device 120. The tip 110 can contain passive control circuitry (e.g., $R_{Vprogram}$ and $R_{Iprogram}$) which is utilized to set the output voltage and limit the output current. The adapter 105 can provide the following outputs: (a) $V_{out}$ (i.e., the output voltage), and (b) a ground reference voltage (GND). The tip 110 provides a feedback $V_{Vprogram}$ to set $V_{out}$. The tip 110 also provides a feedback $V_{Iprogram}$ to the adapter 105 to limit the current of the regulated DC output.

Resistor $R_{Vprogram}$ is located in the tip 110 and forms a voltage divider circuit with $R_{adapter1}$ of the adapter 105. Based on the value of resistor $R_{Vprogram}$, $V_{out}$ can be controlled. Resistor $R_{Iprogram}$ is also located in the tip 110 and forms a voltage divider circuit with $R_{adapter2}$. Based on the value of $R_{Iprogram}$, the maximum current output can be limited.

Figure 1B:
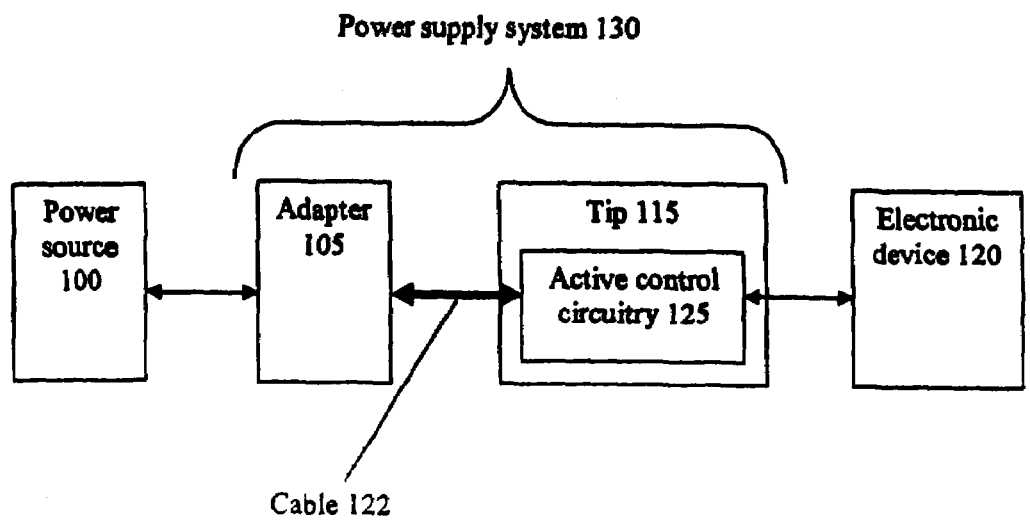
FIG. 1B illustrates a power supply system according to an embodiment of the invention.

FIG. 1B illustrates a power supply system 130 according to an embodiment of the invention. As illustrated, a power source 100 is coupled to an adapter 105. The power source 100 may be an A/C power source such as a household electric outlet. Alternatively, the power source may be a DC source such as an airplane electric outlet, or a cigarette lighter outlet in an automobile, for example. The adapter 105 may be utilized to provide a regulated DC output voltage, $V_{out}$. Accordingly, if the power source 100 is an A/C source, the adapter 105 may include circuitry to covert the A/C voltage to DC. The adapter 105 may also produce a GND signal. The adapter 105 may be coupled to a tip 115 via a cable 122. The tip 115 may include active control circuitry 125 to control $V_{out}$ produced by the adapter 105. The tip 115 may also provide an interface to the electronic device 120. The physical size and shape of the tip 115 may be dependent upon the electronic device 120 being powered. For example, if the electronic device 120 is a laptop computer, the tip 115 may have a different size and shape than it would if the electronic device 120 were a PDA.

Figure 2:
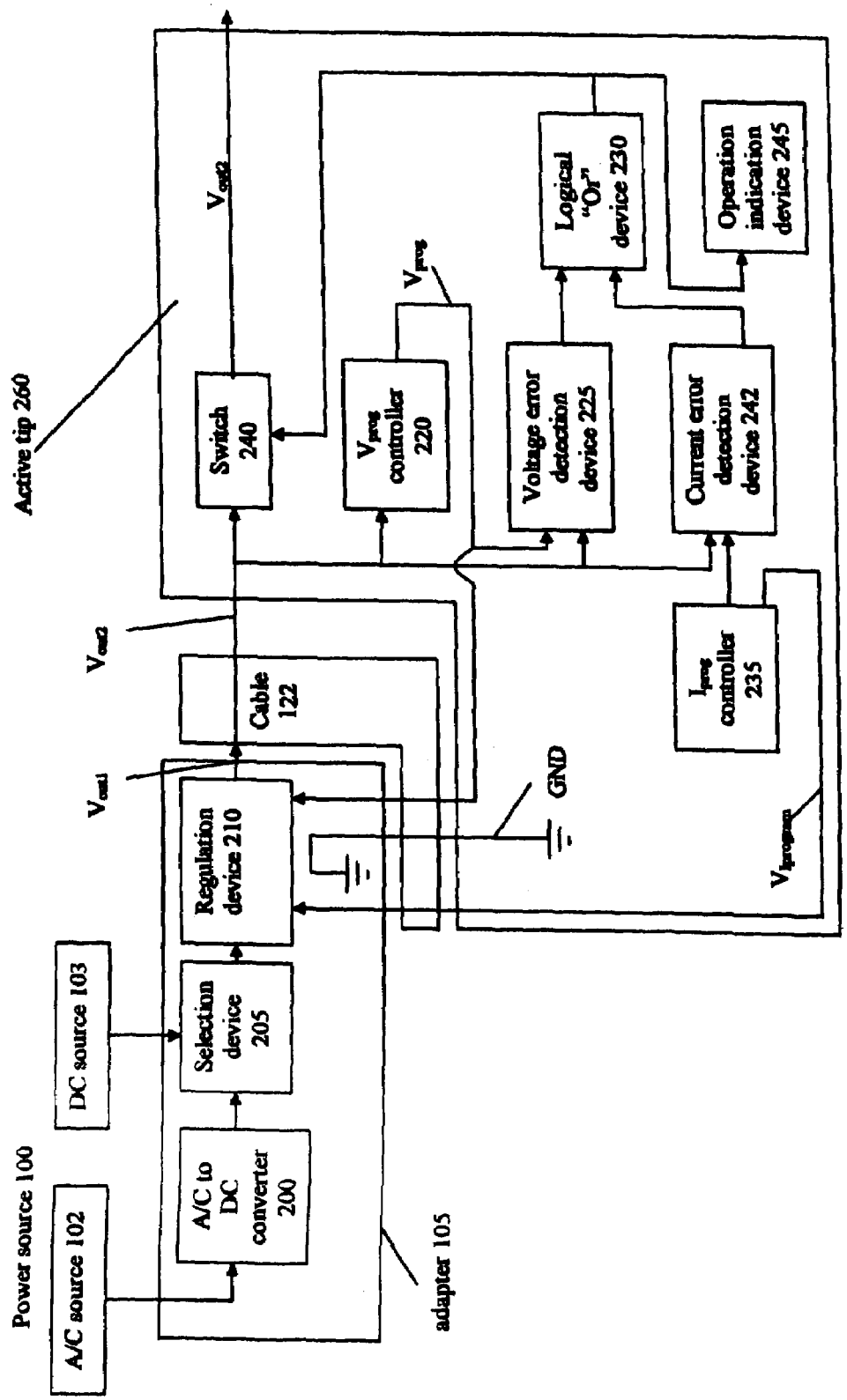
FIG. 2 illustrates a system overview of a power supply system according to an embodiment of the invention.

FIG. 2 illustrates a system overview of a supply system according to an embodiment of the invention. As shown, an A/C source 102 may supply A/C power to an adapter 105. Alternatively, a DC source 103 may supply DC power to the adapter 105. An example of a power source and an adapter 105 is shown in U.S. Pat. No. 6,172,884, the disclosure of which is herein incorporated by reference. The adapter 105 may include an A/C to DC converter 200 to convert an A/C input into a DC output. The adapter 105 may also include a selection device 205. The selection device 205 may be utilized to select a (a) DC input from a DC source 103, or (b) a DC output of the A/C to DC converter 200 when the input is A/C power from an A/C source 102. The selection device 205 may output the selected DC voltage to a regulation device 210. Accordingly, the selection device 205 may provide a DC voltage to the regulation device 210, regardless of whether an A/C source 102 or a DC source 103 is provided to the adapter 105. The regulation device 210 may receive the selected DC voltage and provide an output voltage, $V_{out1}$. $V_{out1}$ may be sent via a cable 122 to an active tip 260. The cable 122 may include an internal resistance. Accordingly, there may be a voltage drop (e.g., $V_{cable}$) across the cable 122. Accordingly, when $V_{out1}$ is output from the adapter 105 to the cable 122, the cable 122 provides a voltage $V_{out2}$ to the active tip 260. However, due to the voltage drop across the cable, $V_{out2}$ will not equal $V_{out1}$. Instead, $V_{out2}$ equals $V_{out1}$-$V_{cable}$. Whereas current systems only control the voltage output from the adapter 105 (i.e., $V_{out1}$), the active tip 260 may be utilized to control the actual voltage received by the active tip 260 (i.e., $V_{out2}$), and provided to the electronic device 120 without further voltage drops. The active tip 260 may include active control circuitry to control the $V_{out2}$ received. Accordingly, the active tip 260 may correct for a voltage drop across the cable 122 so that $V_{out2}$ can be controlled.

The adapter 105 may provide $V_{out1}$ and GND to the cable 122. The adapter 105 may receive the following outputs from the active tip 260 via the cable 122: (a) a programming voltage ($V_{prog}$) to program $V_{out1}$, and (b) a programming current voltage ($V_{Iprog}$) to limit the current from the adapter 105. The active tip 260 may alter the $V_{prog}$ in order to control $V_{out2}$, for example. $V_{out2}$ may enter the active tip 260, and may flow through a switch 240 and out of the active tip 260 to power an external electronic device 120. The switch 240 may be utilized to protect the electronic device 120. For example, if the active tip 260 changes $V_{prog}$ in order to decrease $V_{out2}$, but $V_{out2}$ does not decrease, the active tip 260 may detect an error and open the switch 240 so that $V_{out2}$ does not flow through the switch 240 to the electronic device 120. The switch 240 may also be opened when $V_{prog}$ is changed in order to increase $V_{out2}$, but $V_{out2}$ does not correspondingly increase. The switch 240 may also be opened if the active tip detects excess current. Accordingly, the switch 240 may be utilized to protect the electronic device 120 from becoming oversupplied, for example.

The active tip 260 may include a $V_{prog}$ controller 220 to set $V_{prog}$. For example, in a scenario where lowering $V_{prog}$ causes $V_{out2}$ to be lowered, the $V_{prog}$ controller may compare $V_{out2}$ with a predetermined reference voltage to determine whether $V_{out2}$ needs to be lowered, raised, or remain constant. The $V_{prog}$ controller 220 may also divide $V_{out2}$ by a certain amount before comparing with the reference voltage (e.g., one-half of $V_{out2}$ may be compared with the reference voltage). If $V_{out2}$ needs to be lowered, the $V_{prog}$ controller 220 may lower $V_{prog}$ to a level so $V_{out2}$ is correctly set. The $V_{prog}$ output of the $V_{prog}$ controller 220 may be output to the regulation device 210 in the adapter 105. The regulation device 210 may determine and output $V_{out1}$ based upon the value of $V_{prog}$. For example, $V_{out1}$ may be equal to the product of $V_{prog}$ multiplied by a factor. For example, the regulation device 210 may output a $V_{out1}$ that is 3 times $V_{prog}$. Therefore, if $V_{prog}$ is 3 volts, $V_{out1}$ would be 9 volts, and $V_{out2}$ would be 9 volts minus the $V_{cable}$.

The active tip 260 may also include circuitry to detect when the adapter 105 is functioning improperly. For example, a voltage error detection device 225 may determine when the relationship between $V_{prog}$ and $V_{out2}$ is incorrect. If the regulation device 210 is set to output a $V_{out1}$ that is 3 times $V_{prog}$, and, for example, if $V_{out2}$ is detected as being equal to only 1.5 times $V_{prog}$, then the voltage error detection device 225 may determine that the adapter 105 is functioning improperly. Accordingly, to protect the electronic device 120, if the voltage error detection device 225 detects an error in the relationship between $V_{prog}$ and $V_{out2}$, a signal indicative of the error may be output by the voltage error detection device 225.

The active tip 260 may also include a current error detection device 242 to detect an error between current output by the regulation device 210 and $I_{prog}$. The active tip 260 may include an $I_{prog}$ controller 235 to set $V_{Iprog}$. The $I_{prog}$ controller 235 may be a passive device such as a resistor. The voltage drop across the $I_{prog}$ controller 235 (i.e., $V_{Iprog}$) and $V_{out2}$ may be inputs to the current error detection device 242. When the relationship between $I_{prog}$ and the adapter output current is beyond an acceptable range, the current error detection device 242 may determine an error in the functioning of the adapter 105 and may output a signal indicative of the error.

The outputs of the voltage error detection device 225 and the current error detection device 242 may be received by a logical "or" device 230, which may logically "or" its inputs. If either the voltage error detection device 225 or the current error detection device 242 output a signal indicative of an error, then the logical "or" device 230 may output a signal to open the switch 240. Accordingly, if the adapter 105 is functioning improperly, the active tip 260 may detect the error and open the switch 240, preventing the electronic device 120 from being damaged.

The output of the logical "or" device 230 may also be sent to an operation indication device 245. The operation indication device 245 may include Light Emitting Diodes (LEDs) to indicate whether the adapter 105 is properly functioning. For example, if a signal indicative of an error is output by the logical "or" device 230, the operation indication device 245 may include a red LED which is lit up to indicate the error. However, if no such error signal is output by the logical "or" device 230, a green LED in the operation indication device 245 may be lit, to indicate the correct operation. In other embodiments, devices other than LEDs may be utilized to indicate whether the adapter 105 is functioning properly.

Figure 3:
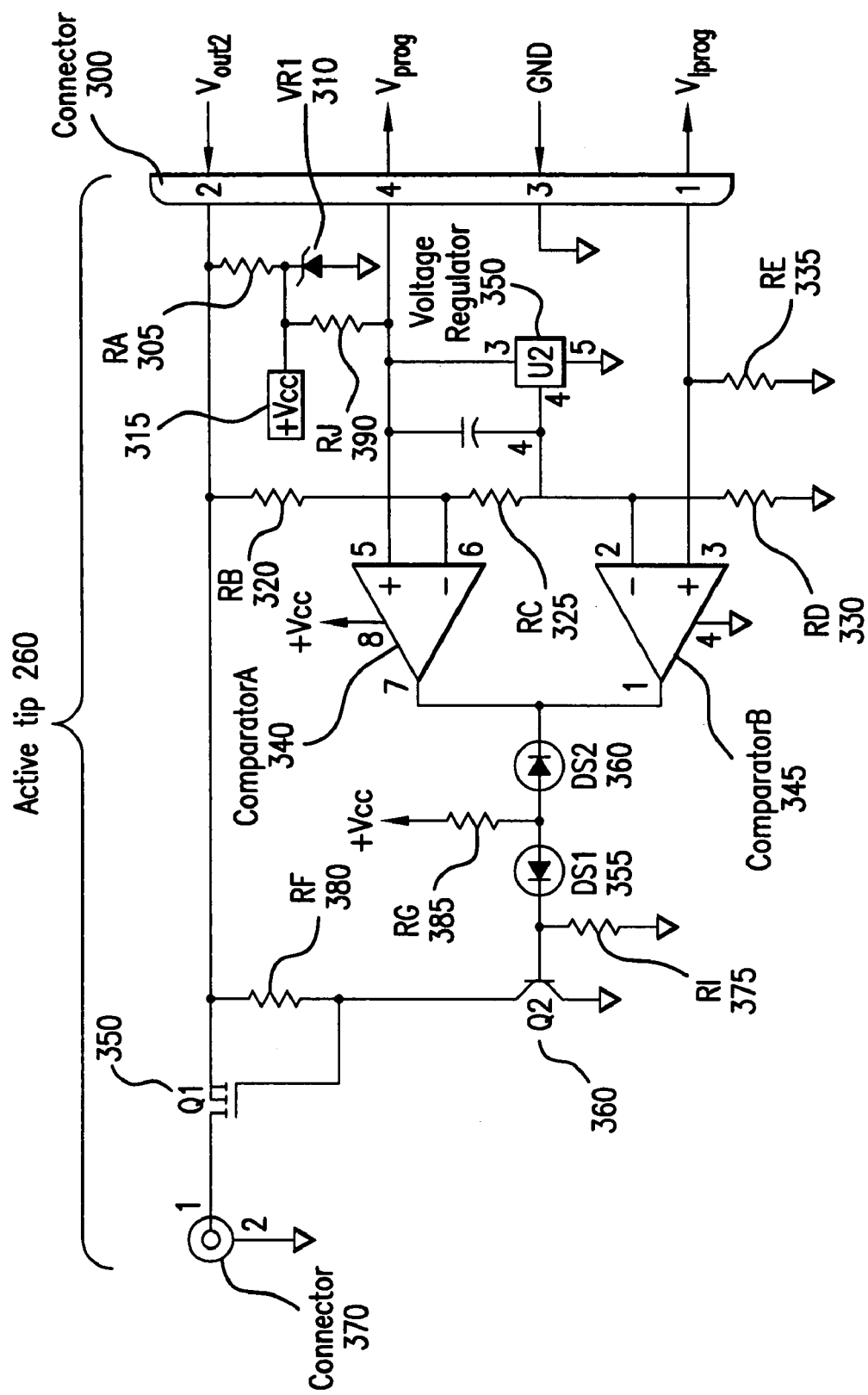
FIG. 3 illustrates a schematic diagram of an active tip according to an embodiment of the invention.

FIG. 3 illustrates a schematic diagram of an active tip 260 according to an embodiment of the invention. As shown on the right side of the active tip 260, a connector 300 may be utilized to couple the active tip 260 to the cable 122. $V_{out2}$ may flow into the active tip 260 via pin 2 of the connector 300, and pin 3 may be coupled to GND. Pin 4 may be utilized to allow $V_{prog}$ to be sent to the cable 122, and to the regulation device 210 of the adapter 105. Pin 1 may allow $V_{Iprog}$ to be applied to the cable 122 and to the regulation device 210 to limit the current.

$V_{out2}$ may be utilized to power circuitry in the active tip 260. Specifically, Resistor RA 305 and a Zener diode VR1 310 lie between $V_{out2}$ and GND. The Zener diode 310 may be utilized to set the $V_{cc}$ 315 of the active circuitry in the active tip 260. In other embodiments, the active tip may receive its $V_{cc}$ directly from the adapter 105. Zener diode 310 may be utilized to set a maximum voltage of $V_{cc}$ 315, such as 10 Volts, for example. The Zener diode 310 may be utilized to protect circuitry in the active tip by limiting the voltage. Resistors RB 320, RC 325, RD 330, are connected between $V_{out2}$ and GND. Resistors RB 320, RC 325, and RD 330 may be utilized to set the inputs to comparator A 340 and comparator B 345.

Resistance values of resistors RB 320, RC 325, and RD 330 in the active tip 260 are selected based on the power requirements of the electronic device 120 being powered. For example, an electronic device requiring 9 volts DC would include different resistance values of resistors RB 320, RC 325, and RD 330 than would be used to provide 12 volts DC to a different electronic device. Accordingly, electronic devices 120 having different DC power requirements require active tips 260 having different resistance values. Resistors RB 320, RC 325, and RD 330 form a voltage divider. The voltage divider is utilized to control the voltage received at pin 4 of a voltage regulator 350. The voltage regulator 350 is utilized to set $V_{prog}$, based on a comparison between the voltage received at pin 4 and an internal reference voltage of the voltage regulator 250 (e.g., 2.5 volts). Because RB 320, RC 325, and RD 330 form a voltage divider, their resistance values may be utilized to control the percentage of $V_{out2}$ received at pin 4 of the voltage regulator 350. Since $V_{prog}$ is set based on a comparison between the voltage regulator's internal voltage and the voltage at pin 4 of the voltage regulator 350, the resistance values of RB 320, RC 325, and RD 330 therefore indirectly control $V_{out2}$.

The voltage regulator 350 may, via its pin 4, receive a voltage equal to $V_{out2}*(RD)/(RB+RC+RD)$. The voltage regulator 350 may compare $[V_{out2}*(RD)/(RB+RC+RD)]$ with an internal reference voltage, such as 2.5 Volts, and output $V_{prog}$ via pin 3. If $[V_{out2}*(RD)/(RB+RC+RD)]$ is greater than the internal reference voltage, then $V_{prog}$ may be lowered. Accordingly, in an embodiment where the regulation device 210 outputs $V_{out1}$ (and the active tip receives $V_{out2}$) that is equal to 3 times $V_{prog}$, $V_{prog}$ may be increased when $V_{out2}$ is too low. $V_{prog}$ may also be decreased in order to lower $V_{out1}$ (and correspondingly lower $V_{out2}$) when $V_{out2}$ is too high. Accordingly, the voltage regulator 350 may serve to control the $V_{out1}$ produced by the regulation device 210 of the adapter 105. The voltage regulator 350 therefore sets $V_{prog}$ based on comparison of its internal reference voltage and $[V_{out2}*(RD)/(RB+RC+RD)]$. $V_{prog}$ is output back to the regulation device 210 to change $V_{out1}$ (and correspondingly, $V_{out2}$). Accordingly, the regulation device 210 provides feedback to the adapter 105 so that $V_{out1}$ (and correspondingly, $V_{out2}$) can be quickly changed as necessary. Due to this feedback, the response time for changing $V_{out1}$ (and correspondingly, $V_{out2}$) may be decreased over what it would be if there were no feedback from active circuitry.

The voltage regulator 350 not only acts to set the magnitude of $V_{out2}$, it also provides additional gain in the feedback loop which compensates for variations in the load of the electronic device 120. The regulation device 210 of the adapter 105 has its own response time for changing $V_{out1}$ (and correspondingly, $V_{out2}$) in response to a load variation. Accordingly, the regulation device 210 of the adapter 105 provides its own gain. However, unlike regulation devices 210 of adapters in the prior art, the regulation device 210 of the adapter 105 according to an embodiment of the invention also receives feedback (i.e., $V_{prog}$) from the voltage regulator 305. The voltage regulator is an active device which provides additional gain to the regulation device 210 of the adapter 105. Thus, the regulation device has greater gain and a quicker response time because the regulation device 210 receives feedback from itself as well as the voltage regulator 305. As discussed above, such combination also does not suffer from any voltage drop (i.e., $V_{cable}$) due to the resistance of the cable 122 connecting the adapter 105 to the active tip 260 since $V_{out2}$ is monitored at the point of application to the device, i.e., at the active tip 260, rather than at the output of the adapter as in prior configurations.

Comparators A 340 and B 345 may be used to control whether transistor Q1 350 is on (normal operation) or off (failure condition) and whether green LED DS1 355 (normal operation) or red LED DS2 360 (failure condition) is illuminated. Comparator A 340 may be utilized as a voltage error detection device 225. When the input to the noninverting input (i.e., $V_{prog}$) exceeds the input to the inverting input (i.e., $[V_{out2}*(RC+RD)/(RB+RC+RD)]$), as it should during normal operation, comparator A 340 is "off." If, however, $[V_{out2}*(RC+RD)/(RB+RC+RD)]$ exceeds $V_{prog}$, comparator A 340 is said to be "on," and outputs a low voltage such as GND. The low voltage may indicate that the adapter 105 is operating improperly.

Resistor RE 335 may be utilized as a current programming device (i.e., $I_{prog}$ controller 235 of FIG. 2). The voltage across resistor RE 335 may be input into the noninverting input of comparator B 345. The input to the inverting input of comparator B 345 may be $[V_{out2}*(RD)/(RB+RC+RD)]$. Comparator B 345 may be utilized as a current error detection device 240. When the input to the noninverting input (i.e., $V_{Iprog}$, which is $[I_{prog}*RE]$) exceeds the input to the inverting input (i.e., $[V_{out2}*(RD)/(RB+RC+RD)]$), as it should during normal operation, comparator B 345 is off. If, however, $[V_{out2}*(RD)/(RB+RC+RD)]$ exceeds $V_{prog}$, comparator B 345 is said to be "on," and outputs a low voltage such as GND. The low voltage may indicate that the adapter 105 is operating improperly.

If either or both of comparators A 340 and B 345 output a low voltage indicative of an error state, LED DS2 360 may be lit. Red LED DS2 360 may be lit to indicate that an error condition has occurred. If no errors are detected, the green LED DS1 355 may be lit.

When both comparators A 340 and B 345 detect correct operation, VCC through RG 385 pulls up the base of Q2 365, and there is sufficient current to turn on transistor Q2 365, thereby pulling low the gate voltage of P-channel FET Q1 350 to turn it on, and allowing $V_{out2}$ to be passed through to pin 1 of the connector 370 going to the electronic device 120 being powered.

When one, or both, of comparators A 340 and B 345 detect an improper operation, the low voltage output by them turns off transistor Q2 360, thereby turning off FET Q1 350 to prevent $V_{out2}$ from being passed to the electronic device 120.

If either comparator A 340 or comparator B 345 is on (e.g., either one outputs GND), then current may flow from Vcc through red LED DS2 360, and then to GND. Accordingly, if either comparator A 340 or comparator B 345 is on, the current will cause red LED DS2 360 to become lit, but not green LED DS1 355.

However, if neither comparator A 340 nor B 345 is on, then both will be off, having no effect on Q2 365. Accordingly, the current will flow from Vcc through resistor RG 385, through green LED DS1 355, and to GND via RI 375. The current will also provide a voltage at the base of transistor Q2 360, activating Q2 360. Once Q2 360 is activated, current may flow through resistor RF 380, and then down to Q2 360 and to GND to turn on, i.e., close, transistor Q1 350. When Q1 350 is closed, $V_{out2}$ may flow out of the active tip 260 via pin 1 of the connector 370, and on into the electronic device 120 being powered.

Resistors RB 320, RC 325, and RD 330 may be different values, depending upon the type of electronic device 120 being powered by the active tip 260. Resistors RB 320, RC 325, and RD 330 are utilized for voltage division. Accordingly, resistors RB 320, RC 325, and RD 330 vary from active tip 260 to active tip 260, depending upon the amount of $V_{out2}$ to be supplied to the electronic device 120. A specific active tip 260 may be utilized to supply power to an electronic device 120 having specified power requirements. Accordingly, when a device having different power requirements is to be utilized, the active tip 260 may be replaced with a different active tip 260 having different resistor values RB 320, RC 325, RD 330, and RJ 390.

The voltage regulator 350 may be a TL431 or TLV431 shunt regulator produced by Texas Instruments, for example. Comparators A 340 and B 345 may be dual differential comparators such as the following models produced by Texas Instruments: LM193, LM293, LM293A, LM393, LM393A, LM2903, or LM2903Q, for example.

Figure 4A:
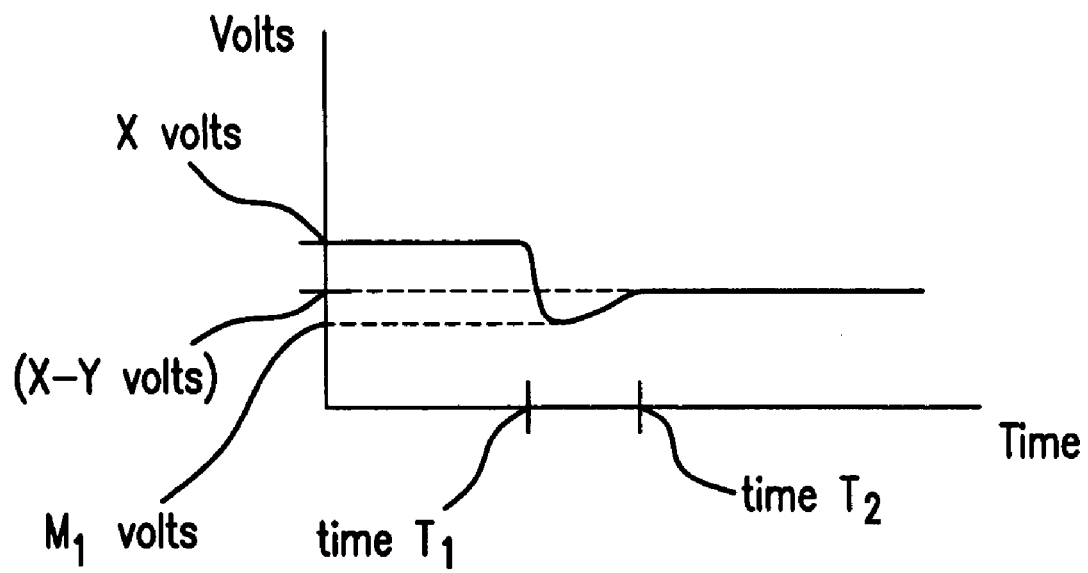
FIG. 4A illustrates a response time (not drawn to scale) of an adapter after a fluctuation in voltage according to the prior art.

FIG. 4A illustrates a response time (not drawn to scale) of an adapter 105 after a fluctuation in voltage according to the prior art. The vertical axis represents voltage, and the horizontal axis represents time. The adapter 105 may output X volts. The cable 122 may have an internal resistance, resulting in a voltage drop (e.g., Y volts) when current is being drawn by the device. Accordingly, voltage reaching the electronic device 120 may equal X-Y volts. If no current is being drawn by the device, the voltage supplied to the device (i.e., the open circuit voltage) is X volts, which case is shown in FIG. 4A. If at time $T_1$, the load increases, the voltage may suddenly drop, eventually down to a low of $M_1$ volts, until the adapter 105 responds by increasing the voltage back up, so that the output of the cable 122 is X-Y volts. As shown, the voltage does not recover until time $T_2$.

Figure 4B:
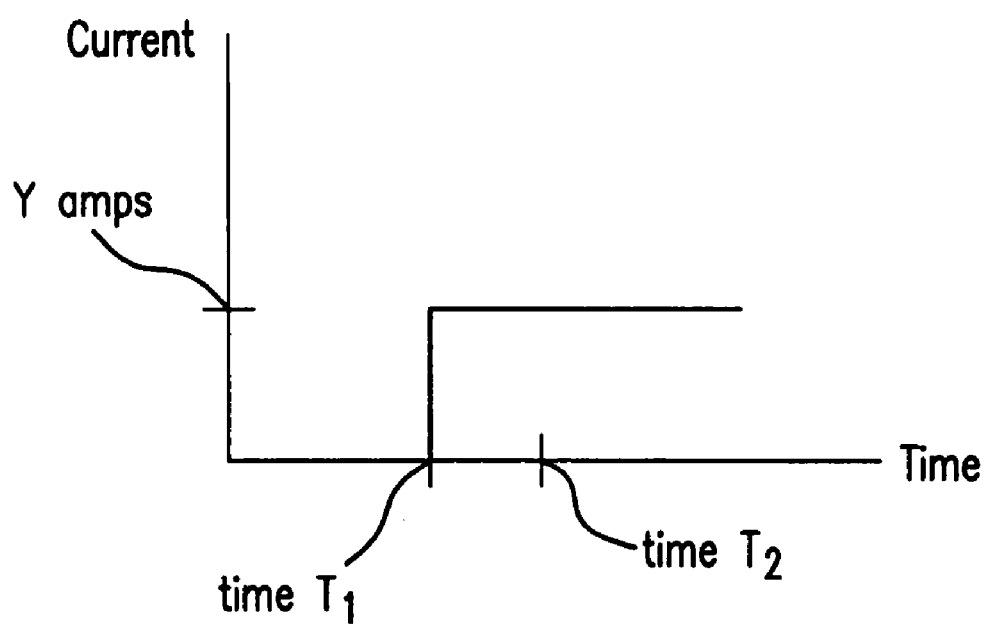
FIG. 4B illustrates the magnitude of current flowing out of the adapter to the electronic device according to an embodiment of the invention.

FIG. 4B illustrates the magnitude of current flowing out of the adapter to the electronic device according to an embodiment of the invention. As shown, at time "0", no current flows from the adapter 105 through the cable 122 and on into the electronic device 120. Accordingly, there is substantially no voltage drop across the cable 122 at this time. However, at time $T_1$, the current increases to Y amps. The increase in the current results in a voltage drop across the cable 122, as shown in FIG. 4A. The current increases, and a voltage drop across the cable 122 is realized before the power source 100 has a chance to compensate (due its delayed response time). Once the power source 100 compensates, the voltage supplied to the electronic device 120 increases to X-Y volts, where Y is the voltage drop across the cable 122.

Figure 4C:
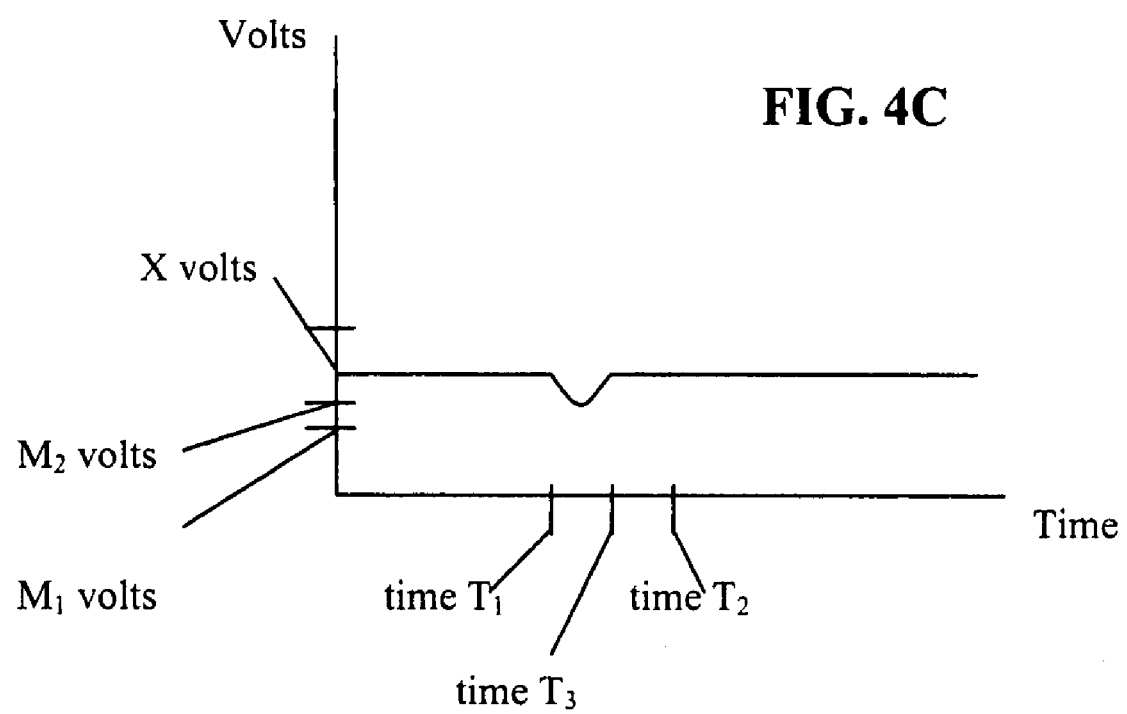
FIG. 4C illustrates a response time (not drawn to scale) of the adapter coupled to the active tip according to an embodiment of the invention.

FIG. 4C illustrates a response time (not drawn to scale) of the system having the adapter 105 coupled to the active tip 260 according to an embodiment of the invention. As shown, the output of the cable 122 is X volts. The output of the cable 122 may be precisely set due to the active circuitry in the active tip 260. At time $T_1$, the load may increase (as shown in FIG. 4B), pulling down the voltage. The active tip 260 may sense the decrease in the voltage, and may increase $V_{prog}$ accordingly, raising the output voltage back up to X volts. As shown, the trough of the voltage is $M_2$ volts. The trough $M_2$ is higher than the trough $M_1$ of the prior art. Also, the time period during which the voltage dips below the correct amount is shorter than that of the prior art. As shown, the prior art has a response time equal to $(T_2-T_1)$, but the response time of the system having the active tip 260 is shorter, $(T_3-T_1)$. The active tip system has a lower response time due to greater loop gain than adapters 105 of the prior art. Because of the gain in the tip (due to the voltage regulator 350), the regulation device 210 of the adapter 105 has a faster response time and, after compensation, raises the voltage at the tip back up to X volts.

Figure 5A:
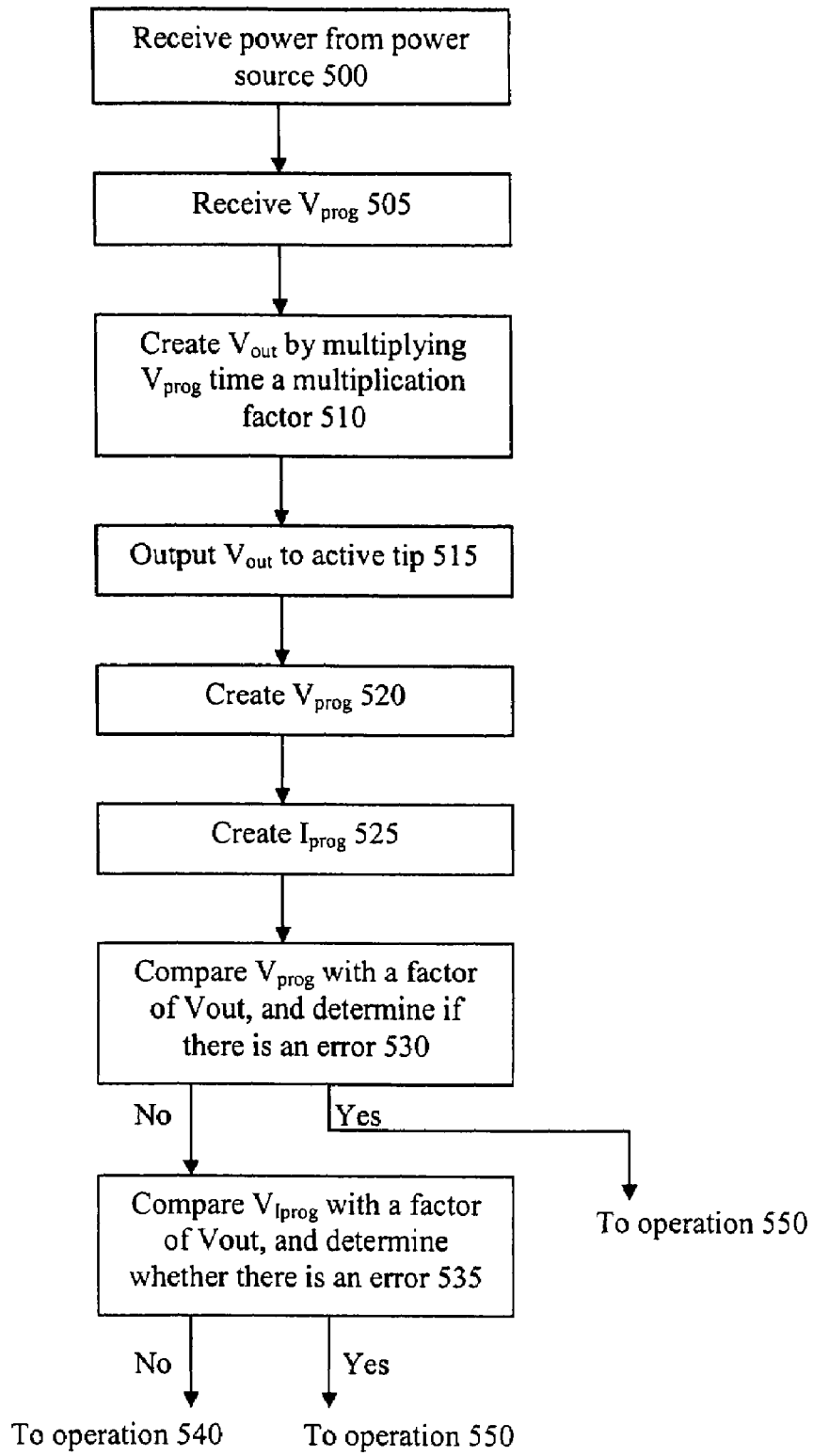
FIG. 5A illustrates a first portion of a method of supplying power to an electronic device via an adapter and active tip according to an embodiment of the invention.

FIG. 5A illustrates a first portion of a method of supplying power to an electronic device 120 via an adapter 105 and active tip 260 according to an embodiment of the invention. First, the adapter may receive 500 power from a power source 100. Next, the adapter 105 may receive 505 $V_{prog}$. The adapter 105 may then create $V_{out}$ by multiplying 510 $V_{prog}$ times a multiplication factor. Next, $V_{out}$ may be outputted 515 to the active tip 260. Based on $V_{out}$, the active tip 260 may create 520 $V_{prog}$. The active tip 260 may then create 525 $I_{prog}$. Next, $V_{prog}$ is compared with $V_{out}$, or a factor of $V_{out}$, to determine 530 whether there is an error. If "yes," processing proceeds to operation 550. If "no," the voltage drop across the $I_{prog}$ controller 235 (i.e., $V_{Iprog}$) is compared with $V_{out}$, or a factor of $V_{out}$, to determine 535 whether there is an error. If "yes," processing proceeds to operation 550. If "no," processing proceeds to operation 540.

Figure 5B:
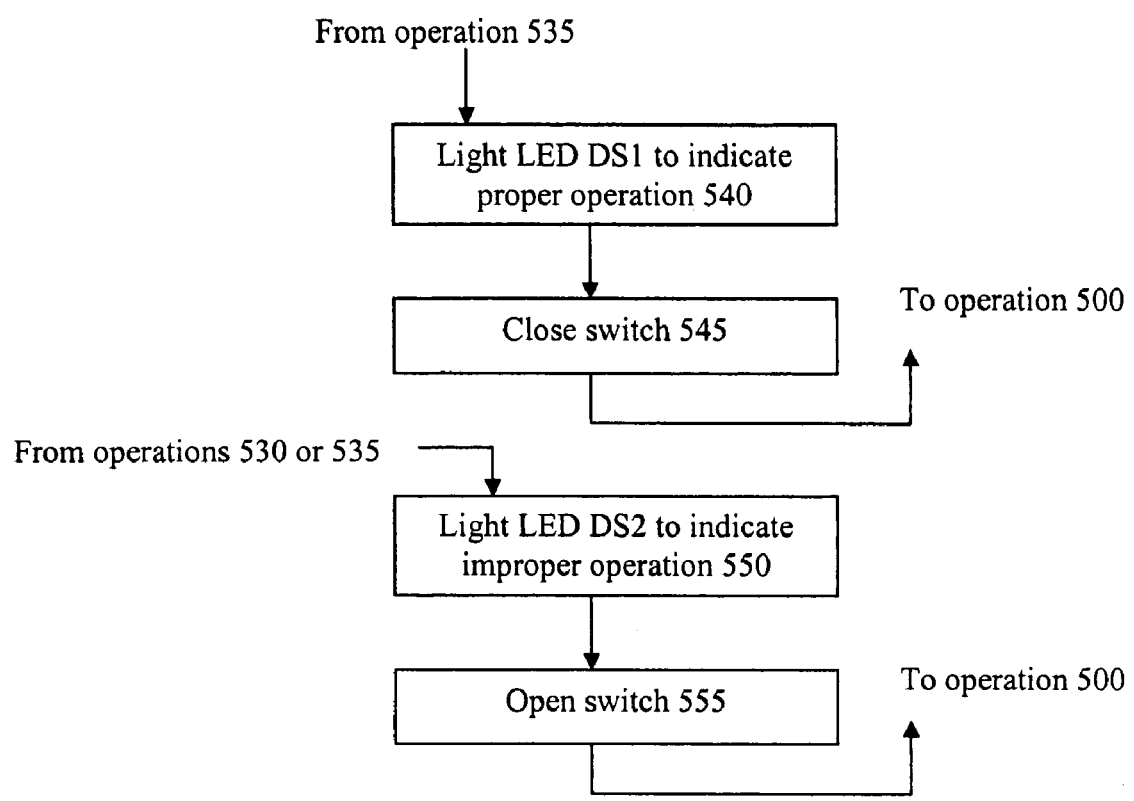
FIG. 5B illustrates a second portion of the method of supplying power to an electronic device via an adapter and active tip according to an embodiment of the invention.

FIG. 5B illustrates a second portion of the method of supplying power to an electronic device 120 via an adapter 105 and active tip 260 according to an embodiment of the invention. At operation 540, LED DS1 355 is lit 540 to indicate proper operation. At operation 545, transistor Q1 350 (i.e., switch 240) is closed, and then processing reverts to operation 500. At operation 550, LED DS2 360 is lit to indicate improper operation. At operation 555, transistor Q1 350 (i.e., switch 240) is opened to protect the electronic device 120. Finally, processing reverts to operation 500.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A power supply system, comprising:
   a power adapter to receive power from a power source and to output a first regulated output voltage ($V_{out}$), the power adapter including a regulation device;
   a cable coupled to the power adapter, the cable having an associated resistance; and
   a tip to receive a second regulated output voltage from the power adapter through the cable through a first connector and provide the second regulated output voltage to the power adapter through a second connector, the second regulated output voltage being based upon the first regulated output voltage but subject to a voltage loss in the cable, the tip including circuitry to provide a fraction of the second regulated output voltage to a voltage regulator to set a programming voltage ($V_{prog}$) based on comparing the fraction of the second regulated output voltage to a reference voltage, the programming voltage being output through the first connector and the cable to control a magnitude of the first output voltage output by the power adapter.

2. The power supply system according to claim 1, wherein the power adapter has a quicker response time in providing the first regulated output voltage ($V_{out}$) due to feedback of the the programming voltage ($V_{prog}$).

3. The power supply according to claim 1, wherein the voltage regulator is selected based upon its predetermined regulation characteristics.

4. The power supply system of claim 1, where the power supply system does not suffer any voltage drop due to the associated resistance of the cable between the power adapter and the tip.

5. A power supply system, comprising:
   a power adapter to receive power from a power source and to output a first regulated output voltage ($V_{out}$), the power adapter including a regulation device;
   a cable coupled to the power adapter, the cable having an associated resistance;
   a tip to receive a second regulated output voltage from the power adapter through the cable through a first connector and provide the second regulated output voltage to the power adapter through a second connector, the second regulated output voltage being based upon the first regulated output voltage but subject to a voltage loss in the cable, the tip including circuitry to provide a fraction of the second regulated output voltage to a voltage regulator to set a programming voltage ($V_{prog}$) based on comparing the fraction of the second regulated output voltage to a reference voltage, the programming voltage being output through the first connector and the cable to control a magnitude of the first output voltage output by the power adapter, and
   a comparator to detect an error in a relationship between a first regulated output voltage ($V_{out}$) and the programming voltage ($V_{prog}$).

6. The power supply system of claim 5, wherein the tip further includes a first lighting device to light when the error is detected.

7. The power supply system of claim 5, the tip further including a switch to open, to prevent the second regulated output voltage from reaching the electronic device, when the error is detected.

8. The power supply system of claim 5, wherein the tip includes a second lighting device to light when no error is detected.

9. The power supply system of claim 5, further including a switch to close, to allow the second regulated output voltage to reach the electronic device, when no error is detected.

10. The power supply system of claim 5, where the power supply system does not suffer any voltage drop due to the associated resistance of the cable between the power adapter and the tip.

11. A method of supplying power to an electronic device, the method comprising:
   receiving a compensated output voltage at a tip, the compensated output voltage being the difference being a regulated output voltage provided from an adapter and voltage loss across a cable coupling the adapter to the tip;
   setting, at a tip, a programming voltage ($V_{prog}$) based on comparison of a predetermined fraction of the compensated output voltage received at the tip and a reference voltage utilizing a regulator, the predetermined fraction defined by resistors within the tip;
   feeding back the programming voltage ($V_{prog}$) to a regulator in the adapter to control a magnitude of the regulated output voltage provided by the adapter; and
   outputting, via the tip, the compensated output voltage to the electronic device.

12. The method of claim 11, further including detecting an error in a relationship between the predetermined fraction of the compensated output voltage and the programming voltage.

13. The method of claim 12, further including lighting a lighting device, located within the tip, when the error is detected.

14. The method of claim 12, further including opening a switch located in the tip, to prevent Vout from reaching the electronic device, when the error is detected.

15. The method of claim 12, further including lighting a lighting device, located within the tip, when the error is not detected.

* * * * *